(12) United States Patent
Van Esbroeck et al.

(10) Patent No.: US 11,628,616 B2
(45) Date of Patent: Apr. 18, 2023

(54) ADDITIVE MANUFACTURING DEVICE AND METHOD

(71) Applicant: Structo Pte Ltd, Singapore (SG)

(72) Inventors: Hubertus Theodorus Petrus Van Esbroeck, Singapore (SG); Shanmugam Muruga Palaniappan, Singapore (SG); Devansh Sharma, Singapore (SG); Siu Hon Lam, Singapore (SG); Kah Fai Chin, Singapore (SG); Yong Chuan Randall Sie, Singapore (SG)

(73) Assignee: Structo Pte Ltd, Singapore (SG)

( * ) Notice: Subject to any disclaimer, the term of this patent is extended or adjusted under 35 U.S.C. 154(b) by 33 days.

(21) Appl. No.: 17/005,023

(22) Filed: Aug. 27, 2020

(65) Prior Publication Data

US 2021/0023776 A1    Jan. 28, 2021

Related U.S. Application Data

(62) Division of application No. 14/541,114, filed on Nov. 13, 2014, now Pat. No. 10,792,859.

(Continued)

(51) Int. Cl.
*B29C 64/129* (2017.01)
*B29C 64/241* (2017.01)
(Continued)

(52) U.S. Cl.
CPC .......... *B29C 64/129* (2017.08); *B29C 64/241* (2017.08); *B33Y 10/00* (2014.12); *B33Y 30/00* (2014.12); *B29C 64/264* (2017.08)

(58) Field of Classification Search
CPC ... B29C 64/106; B29C 64/129; B29C 64/135; B29C 64/241
See application file for complete search history.

(56) References Cited

U.S. PATENT DOCUMENTS 4,019,807 A    4/1977  Boswell et al.
4,575,330 A    3/1986  Hull
(Continued)

FOREIGN PATENT DOCUMENTS

CN    102300698 B    12/2011
CN    102892570 A    1/2013
(Continued)

OTHER PUBLICATIONS

Foreign Communication From a Related Counterpart Application, Second Written Opinion of the International Preliminary Examining Authority dated Nov. 17, 2015, International Application No. PCT/SG2014/000530 filed on Nov. 12, 2014.

(Continued)

*Primary Examiner* — Manley L Cummins, IV
(74) *Attorney, Agent, or Firm* — Optimus Patents US, LLC

(57) ABSTRACT

Disclosed is an additive manufacturing device, comprising: a vessel for containing a material which is polymerisable on exposure to radiation; a build platform having a build surface, the build platform being mounted or mountable for movement relative to the vessel; and a programmable radiation module comprising an array of individually addressable radiation emitting or transmitting elements, the array being configurable to produce radiation having a predetermined pattern by selective activation of elements of the array; wherein the programmable radiation module is positioned or positionable to irradiate uncured material adjacent the build surface, or adjacent a previously cured structure on the build surface, with the predetermined pattern without magnification. Also disclosed is an additive manufacturing method which employs the additive manufacturing device.

10 Claims, 14 Drawing Sheets

Section A-A

Related U.S. Application Data

(60) Provisional application No. 61/904,070, filed on Nov. 14, 2013.

(51) Int. Cl.
   *B33Y 10/00* (2015.01)
   *B33Y 30/00* (2015.01)
   *B29C 64/264* (2017.01)

(56) References Cited

U.S. PATENT DOCUMENTS

| | | | |
|---|---|---|---|
| 4,961,154 | A | 10/1990 | Pomerantz et al. |
| 5,031,120 | A | 7/1991 | Pomerantz et al. |
| 5,042,922 | A | 8/1991 | Pepper |
| 5,089,184 | A * | 2/1992 | Hirano .............. B29C 64/135 250/432 R |
| 5,122,441 | A | 6/1992 | Lawton et al. |
| 5,143,663 | A | 9/1992 | Leyden et al. |
| 5,171,490 | A | 12/1992 | Fudim |
| 6,537,482 | B1 | 3/2003 | Farnworth |
| 2002/0149137 | A1 | 10/2002 | Jang et al. |
| 2006/0022379 | A1 | 2/2006 | Wicker et al. |
| 2006/0161287 | A1 | 7/2006 | Simonis |
| 2008/0169589 | A1 | 7/2008 | Sperry et al. |
| 2011/0089610 | A1 | 4/2011 | El-Siblani et al. |
| 2011/0234357 | A1 | 9/2011 | Kim et al. |
| 2012/0106150 | A1 | 5/2012 | Vaes et al. |
| 2012/0195994 | A1 * | 8/2012 | El-Siblani .............. B33Y 10/00 15/320 |
| 2013/0001834 | A1 | 1/2013 | El-Siblani et al. |
| 2013/0052292 | A1 | 2/2013 | Busato |
| 2013/0295212 | A1 * | 11/2013 | Chen .............. B29C 64/129 425/150 |
| 2014/0339741 | A1 | 11/2014 | Aghababaie et al. |
| 2020/0055251 | A1 * | 2/2020 | Medalsy .............. B29C 64/30 |

FOREIGN PATENT DOCUMENTS

| | | | |
|---|---|---|---|
| JP | 62288844 | A | 12/1985 |
| JP | 03227222 | A | 10/1991 |
| JP | 04156325 | A | 5/1992 |
| JP | 04247931 | A | 9/1992 |
| JP | 05503257 | A | 6/1993 |
| JP | 05329940 | A | 12/1993 |
| JP | 06198747 | A | 7/1994 |
| JP | 06226862 | A | 8/1994 |
| JP | H08281810 | A | 10/1996 |
| JP | 2006043953 | A | 2/2006 |
| JP | 2012516539 | A | 7/2012 |
| JP | 6228844 | B2 | 6/2013 |
| JP | 2013528514 | A | 7/2013 |
| TW | 244379 | B | 4/1995 |
| WO | 199207705 | A1 | 5/1992 |
| WO | 9515841 | A1 | 6/1995 |
| WO | 010005575 | A1 | 1/2001 |
| WO | 0172501 | A1 | 4/2001 |
| WO | 2010087708 | A | 8/2010 |
| WO | 2011144580 | A1 | 11/2011 |

OTHER PUBLICATIONS

Foreign Communication From a Related Counterpart Application, International Search Report dated Feb. 17, 2015, International Application No. PCT/SG2014/000530 filed on Nov. 12, 2014.

Foreign Correspondence From a Related Counterpart Application, Supplemental European Search Report dated Jan. 18, 2017, EP Application No. 14 86 2801.

Foreign Communication from a Related Counterpart Application, Notification of Reasons for Refusal dated Oct. 23, 2018, Japan Application No. 2016-554168.

Restriction Requirement dated Apr. 3, 2017, U.S. Appl. No. 14/541,114, filed Nov. 13, 2014.

First Action Interview Pre-Interview Communication dated Aug. 16, 2017, U.S. Appl. No. 14/541,114, filed Nov. 13, 2014.

Luo, Ren C., et al., "Development of a LCD Photomask Based Desktop Manufacturing System", Motion Control, Jan. 2010, INTECH, pp. 580, retrieved from www.intechopen.com.

First Action Interview Office Action dated Jan. 24, 2018, U.S. Appl. No. 14/541,114, filed Nov. 13, 2014.

Final Office Action dated Jul. 13, 2018, U.S. Appl. No. 14/541,114, filed Nov. 13, 2014.

Advisory Action dated Nov. 7, 2018, U.S. Appl. No. 14/541,114, filed Nov. 13, 2014.

Final Office Action dated Dec. 4, 2019, U.S. Appl. No. 14/541,114, filed Nov. 13, 2014.

Office Action dated Mar. 26, 2019, U.S. Appl. No. 14/541,114, filed Nov. 13, 2014.

Notice of Allowance dated Jun. 16, 2020, U.S. Appl. No. 14/541,114, filed Nov. 13, 2014.

* cited by examiner

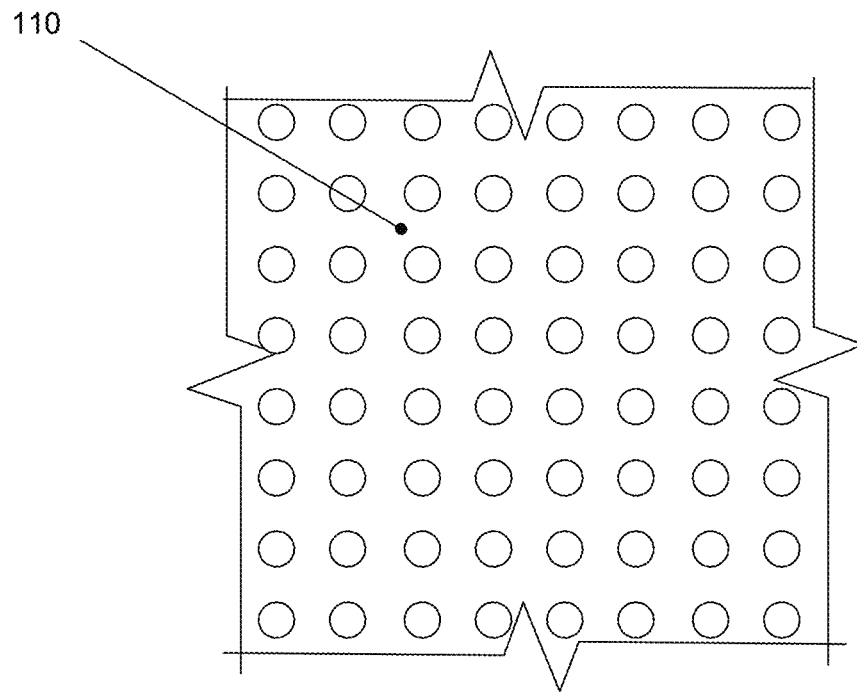
FIG.1B: Section A-A
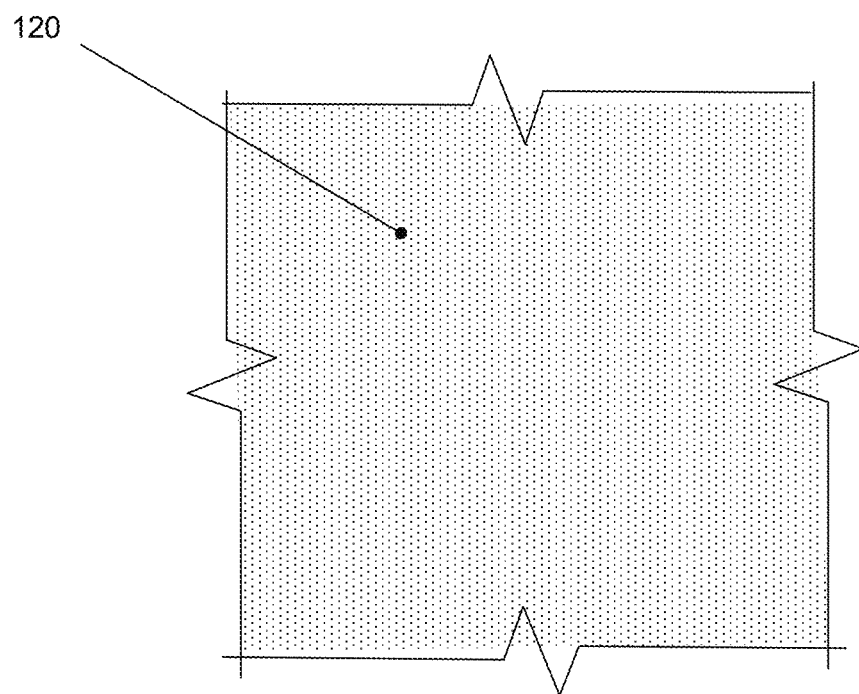
FIG.1C: Section B-B

ADDITIVE MANUFACTURING DEVICE AND METHOD

CROSS-REFERENCE TO RELATED APPLICATIONS

This application claims is a divisional of and claims priority under 35 U.S.C. § 119 to U.S. application Ser. No. 14/541,114 filed in the United States Patent and Trademark Office on Nov. 13, 2014 and entitled, "Additive Manufacturing Device and Method", which claims priority to U.S. Provisional Application No. 61/904,070 filed in the United States Patent and Trademark Office on Nov. 14, 2013 and entitled, "Additive Manufacturing Device and Method" both of which are incorporated herein by reference in their entirety.

TECHNICAL FIELD

This invention relates to a stereolithographic method of additive manufacturing that allows for high speed printing of large objects, at fine resolution, and to a device for carrying out the method.

BACKGROUND

A typical stereolithographic additive manufacturing device involves a source of radiation and a means of directing that radiation in accordance with specific patterns onto a layer of polymerizable material. The radiation causes this material to polymerize, i.e., to at least partially solidify. A common type of stereolithographic additive manufacturing machine utilizes a laser which emits a collimated beam of radiation in the ultraviolet or near-ultraviolet range of the electromagnetic spectrum. The process of manufacturing a three-dimensional part with such an additive manufacturing apparatus may comprise the following steps:

1. A mirror, lens or assembly of optical components is used to direct the laser beam in accordance with pre-determined patterns. In this type of machine, there is at least one mirror or lens which may be electronically actuated to move in order for the optical assembly to be capable of altering the direction of the laser beam.

2. The point where the laser beam strikes the layer of polymerizable material travels along a scan path such that all regions where polymerization is desired will be illuminated by the laser beam for a sufficiently long amount of time to cause the polymerization.

3. When each of the desired regions in a given layer of material have been polymerized, an assembly of mechanical and/or electrical components is capable of depositing a new layer of such polymerizable material on top the last polymerized layer, and the cycle repeats.

Each layer may have a different pre-determined pattern and the laser beam is capable of travelling along the path required to polymerize each of the regions in such a pattern, so that three-dimensional objects of varying cross-sections may be produced using the additive manufacturing device.

A major disadvantage of the prior art stereolithographic method of additive manufacturing is that it is slow. The laser beam must travel along a path so as to illuminate all regions of the layer of material where polymerization is desired. For a laser beam having a fixed width and a constant speed of travel, the time required to print an object increases linearly with the dimensions of said object and the density or number of features in a given layer. A scanning laser stereolithographic printing device can achieve a certain maximum scanning speed, i.e., if the printable area is doubled, the scanning laser would take twice as long to cure one layer of that area.

An evolution of the stereolithographic process described above is one in which the laser beam and optical assembly are replaced by a Digital Micromirror Device (DMD) projection device, capable of rendering monochromatic images using electronically addressable reflectors. Such additive manufacturing devices offer the possibility of "layer-by-layer" as opposed to "dot-by-dot" printing, i.e. high speed printing. The typical system comprises what is essentially an overhead projector having a digital micromirror device (DMD) and a light source which emits at least some ultraviolet light. The projector projects an image (e.g. white on black background, where white regions are illuminated by light which is at least partially ultraviolet) onto a layer of photoactive resin, such that the white areas of the image will cure as a result of the incident UV light. Currently, DMD chips having resolutions of up to 1920×1080 pixels can be manufactured, thus allowing for very rapid layer-by-layer printing: a single exposure of a pattern image from a DMD-based projection system can cause polymerization in 1920×1080 (over 2 million) small regions of polymerizable material, whereas a laser-based system would require the single dot at the end of its laser beam to travel along a path illuminating each of the 2 million dots individually.

The main disadvantage of a DMD-chip based printing method is that the dimensions of the largest object that may be printed with such an apparatus is limited: If the projected area is enlarged (scaled), there will be two disadvantages:

1. As the number of addressable pixels is fixed at a maximum of 2 million, the projected image is stretched if a large object is to be printed. To scale the image for a build size of 1 meter by 2 meters, each pixel would be stretched to occupy approximately 1 mm×1 mm, which is far coarser than is acceptable for 3D printed object resolution.

2. The curing time (exposure time required for polymerization to occur) increases significantly when the projected image is scaled for large build sizes. The light emitted from the same source (e.g. single bulb) must be distributed over a larger surface area, i.e. the total number of photons incident on a given amount of photoactive resin per unit time is reduced whenever the build size is scaled up.

The present invention seeks to overcome one or more of the above disadvantages, or at least to provide a useful alternative.

SUMMARY

Some embodiments relate to an additive manufacturing device, comprising:
- a vessel for containing a material which is polymerisable on exposure to radiation;
- a build platform having a build surface, the build platform being mounted or mountable for movement relative to the vessel; and
- a programmable radiation module comprising an array of individually addressable radiation emitting or transmitting elements, the array being configurable to produce radiation having a predetermined pattern by selective activation of elements of the array;
- wherein the programmable radiation module is positioned or positionable to irradiate uncured material adjacent the build surface, or adjacent a previously cured structure on the build surface, with the predetermined pattern without magnification.

Other embodiments relate to an additive manufacturing method, comprising:
- at least partially filling a vessel with a material which is polymerisable on exposure to radiation;
- providing a programmable radiation module comprising an array of individually addressable radiation emitting or transmitting elements;
- providing a build platform having a build surface;
- positioning the build platform relative to the vessel such that an uncured layer of polymerisable material is defined between the build surface and the programmable radiation module; and
- irradiating the uncured layer of polymerisable material with radiation having a predetermined pattern, without magnification, by selectively activating elements of the array of the programmable radiation module in order to polymerise the uncured layer with the predetermined pattern.

The patterned radiation produced by the programmable radiation module allows layer-by-layer curing of the polymerisable material in the vessel, thus providing faster and more scalable production of three-dimensional structures than prior art arrangements which use scanning lasers. In particular, the achievable printing speed is independent of the layer thickness and resolution. An inherent problem in many other 3D printing technologies is the need to strike a balance between desired resolution and desired printing speed: if a user requires a finer vertical resolution, e.g. twice as thin layers, the print job will take twice as much time, as the printing speed is limited by the speed at which the scanning laser can move. In embodiments of the present invention, making the layers twice as thin means that each layer can be cured with a pulse of light that is less than half as long (as there is half as much polymerizable material by volume present to be cured). The overall print job duration for the object is therefore independent of layer thickness. The same principle applies to X-Y resolution, which is only controlled by the resolution (as measured in dots per inch, for example) of the addressable array of the radiation module.

An additional advantage with respect to scanning laser systems is the reduction in moving parts. As there is no scanning laser, the build table is the only component that is mechanically actuated, resulting in lower costs and greater durability.

Further, by irradiating the uncured fluid without magnification (i.e., with a substantially 1:1 magnification ratio), it is possible to avoid certain disadvantages of DLP projection based systems. In particular, in order to scale up to larger print sizes, a DLP projector needs to increase the projected area, thereby lowering the intensity of illumination per unit surface area and thus increasing the cure time.

In some embodiments, the programmable radiation module comprises a liquid crystal display (LCD) containing the array of individually addressable radiation transmitting elements, the radiation transmitting elements in this case being the pixels of the LCD. The use of an LCD is particularly advantageous since LCD units are orders of magnitude less expensive than DLP projectors.

Preferably, the LCD is a monochrome LCD. For printing applications, light in the ultraviolet (UV) or true violet (TV) range is most effective, as each photon carries a relatively large amount of energy. The wavelength for these photons ranges from approx 300-450 nm. All of the sub-pixel colour filters (R, G, and B) in a colour LCD prevent most of the light of such wavelengths from passing through them, i.e. the intensity of effective photons transmitted through a normal LCD is minimal. For this reason, the use of a monochrome LCD, which does not have any colour filters, has been found to give much shorter curing time (more photons of suitable wavelength are transmitted).

BRIEF DESCRIPTION OF THE DRAWINGS

Embodiments of the invention will now be described, by way of non-limiting example only, with reference to the accompanying drawings in which:

FIGS. 1A, 1B, and 1C show an exploded cross-sectional view of an additive manufacturing device according to some embodiments of the invention;

DETAILED DESCRIPTION OF EMBODIMENTS

In certain embodiments, an additive manufacturing device comprises a radiation source (such as a stroboscopic light source emitting visible light having a wavelength of 400-700 nm) on top of which is mounted a liquid crystal display, e.g. a diffuser assembly comprising one or more sheets with diffusive properties, followed by two polarizing panels at right angles to each other, the polarizing panels sandwiching a layer of liquid crystals. The liquid crystal display (LCD) assembly may be covered with a glass or transparent plastic panel and a layer of transparent silicone or other cure-inhibiting or low friction material.

The above arrangement can achieve printing speeds in excess of scanning laser systems, since an entire layer is exposed in a single pulse of stroboscopic light, whereas a scanning laser must scan the entire path that is to be cured. In the presently described embodiments, the printing speed per layer is independent of the number of features (or surface area) to be cured in each layer. Unlike with scanning lasers, in the presently described embodiments it takes an equally long pulse of light to cure the entire full solid layer as it does to cure a small shape within that area. LCD panels can presently be manufactured to very large sizes (to the order of meters in length and width dimensions) and increasingly high resolutions (in excess of 16 million pixels), thus the layer-by-layer printing technology of at least some embodiments is better scalable and capable of printing larger objects at finer resolution than DMD-based systems.

Figure 1A:
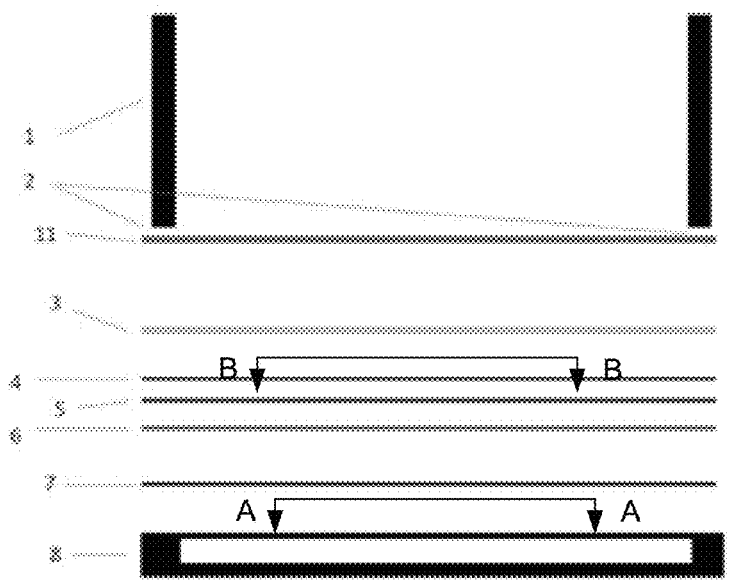

Referring now to FIGS. 1A, 1B, and 1C, there is shown a schematic exploded view of an additive manufacturing device 100 according to some embodiments of the invention. The additive manufacturing device 100 comprises a vessel 1 for containing a polymerizable material 40. The vessel 1 has a transparent lower wall 11, sidewalls 102 and a seal 2 between the transparent lower wall 11 and the sidewalls 102 of vessel 1. The seal may be formed from a material such as epoxy which is cured in situ to seal the vessel, but it could also be a solid seal such as a rubber (nitrile or viton, for example) O-ring or gasket. Preferably, the vessel 1 has four sidewalls defining a rectangular or square internal region, but it may of course have a single cylindrical sidewall or other configuration.

The device 100 may further comprise a rigid transparent member 3 which provides structural strength to vessel 1, though this may be omitted if lower wall 11 is sufficiently sturdy. Underneath rigid transparent member 3, a liquid crystal display (LCD) 5 is sandwiched between a first polarizer panel 4 and a second polarizer panel 6. The direction of polarization of the first polarizer panel 4 is perpendicular to that of the second polarizer panel 6. Below the second polarizer panel 6 there may be provided an optical assembly 7 which may comprise various optical components capable of diffusing, collimating, reflecting or refracting light from a light source 8. Typically the optically assembly 7 includes diffusing and collimating elements.

Figure 7:
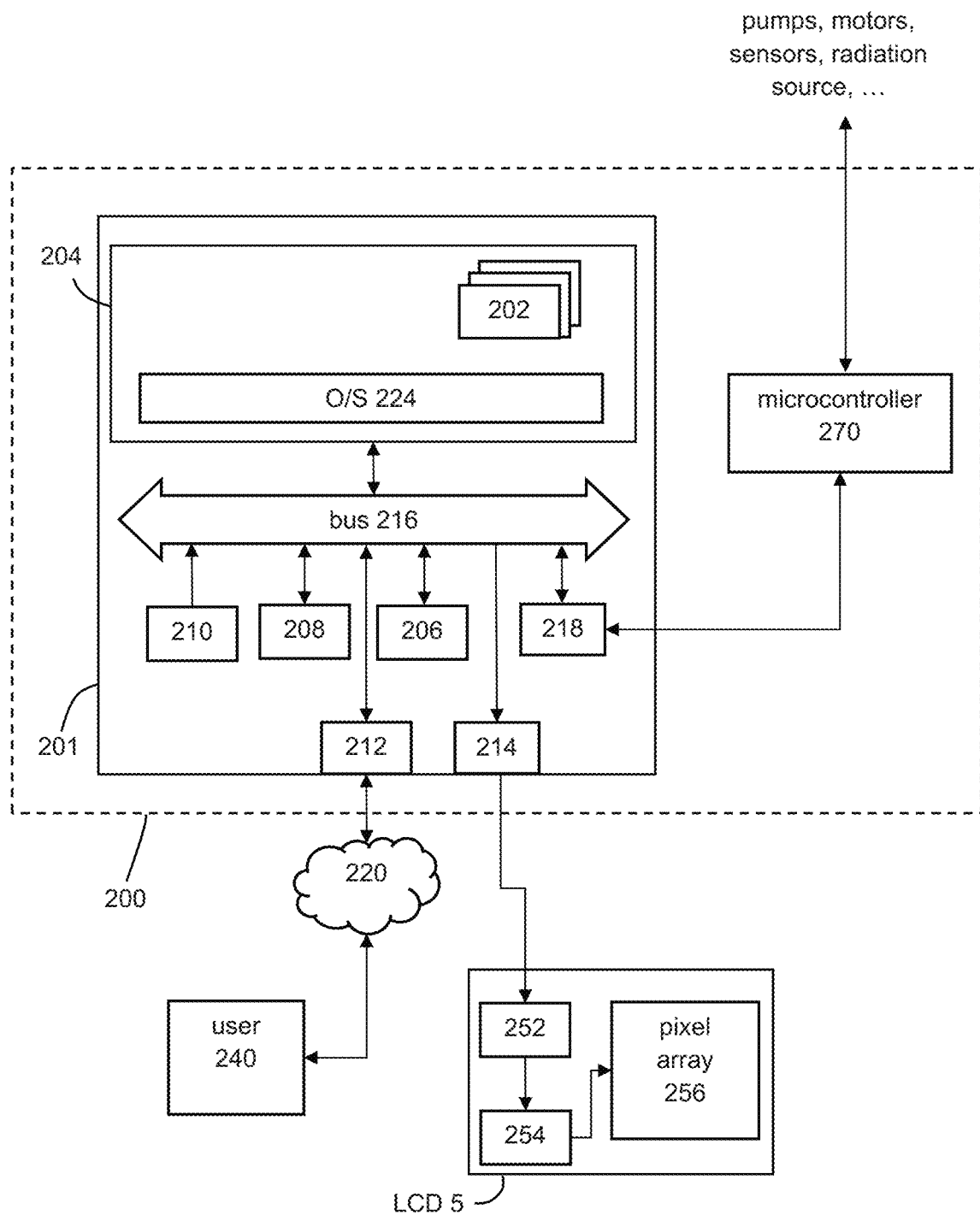
FIG. 7 is a block diagram of an exemplary control system for an additive manufacturing device according to embodiments.

The LCD 5, polarisers 4 and 6, and light source 8, and optical assembly 7 form part of a programmable radiation module 10 (FIG. 2) which is attached to the transparent lower wall 11 of the vessel 1 and which can be configured to produce a patterned beam of radiation to cure a layer of resin in the vessel 1 with a desired pattern. The pixels of LCD 5 constitute individually addressable elements which may be switched on or off by a control system of the device 100, which is coupled to the LCD 5 (as shown in FIG. 7). When a pixel is activated (switched on), it allows light to be transmitted through it, whereas when it is inactive (switched off), it blocks light. Accordingly, the pixels of LCD 5 are individually addressable light transmitters which can be programmed by the control system to produce the desired pattern of radiation, with the inactive pixels acting as masking elements.

The LCD 5 is preferably a monochrome LCD. In a colour LCD, each pixel is made up of three or four individually addressable sub-pixels, each having a colour filter that allows light in a narrow wavelength band to pass through it. The panchromatic white backlight in a colour LCD emits all wavelengths between 400-700 nm, and colour is created by selectively allowing this white light to pass through the red, green and blue (R,G,B) filtered sub-pixels. For printing applications, light in the ultraviolet (UV) or true violet (TV) range is most effective, as each photon carries a relatively large amount of energy. The wavelength for these photons ranges from approx 300-450 nm. All of the sub-pixel filters (R, G, and B) in a colour LCD prevent light of such wavelengths from passing through it, i.e. the intensity of effective photons transmitted through a normal LCD is minimal. For this reason, the use of a monochrome LCD, which does not have any colour filters, has been found to give much shorter curing time (more photons transmitted).

In some embodiments, the radiation module may comprise a panel of individually addressable light emitters in an array, such as an LED or OLED display. In similar fashion to the LCD 5, the panel can be programmed by the controller such that selected light emitters are active at any given time, in order to produce the desired pattern of radiation. In these embodiments, the individually addressable elements of the radiation module themselves emit the radiation in the desired curing pattern, rather than acting as a mask for a separate radiation source. LEDs and Organic LEDs can in principle be designed to emit any particular wavelength of light (visible, UV, IR) to match the specific curing requirement of the polymerisable fluid. In these embodiments, the additive manufacturing device could be made more compact as no "backlight" as such is required when the display panel itself is the light source, and the need for an optical assembly between the separate light source and LCD is also eliminated.

In the configuration shown in FIGS. 1A, 1B, and 1C, the radiation module 10 is attached to the lower wall 11 and sidewalls 102 of the vessel 1. However, in alternative embodiments, the radiation module 10 may be located within or be integral to the vessel 1. For example, the sidewalls 102 and lower wall 11 may be aluminium plates which are welded together to form the vessel 1 (with the lower wall 11 in this case obviously not being transparent), and the radiation module 10 may then be placed inside the vessel 1. A transparent sealing layer may be placed over the top of the radiation module 10 to prevent leakage of polymerizable material into the radiation module 10, for example.

The array of pixels of LCD 5 may be sized to cover substantially the entire surface area of the transparent lower wall 11, such that substantially the entire volume above the transparent lower wall 11 is a printable volume. In alternative embodiments, the pixel array may cover a surface area which is smaller than the surface area of transparent lower wall 11. For example, the pixel array may have a surface area equal to or slightly larger than that of the build surface 92 of the build platform 9, such that the perimeter of the build surface 92 fits inside the perimeter of the pixel array.

Figure 2:
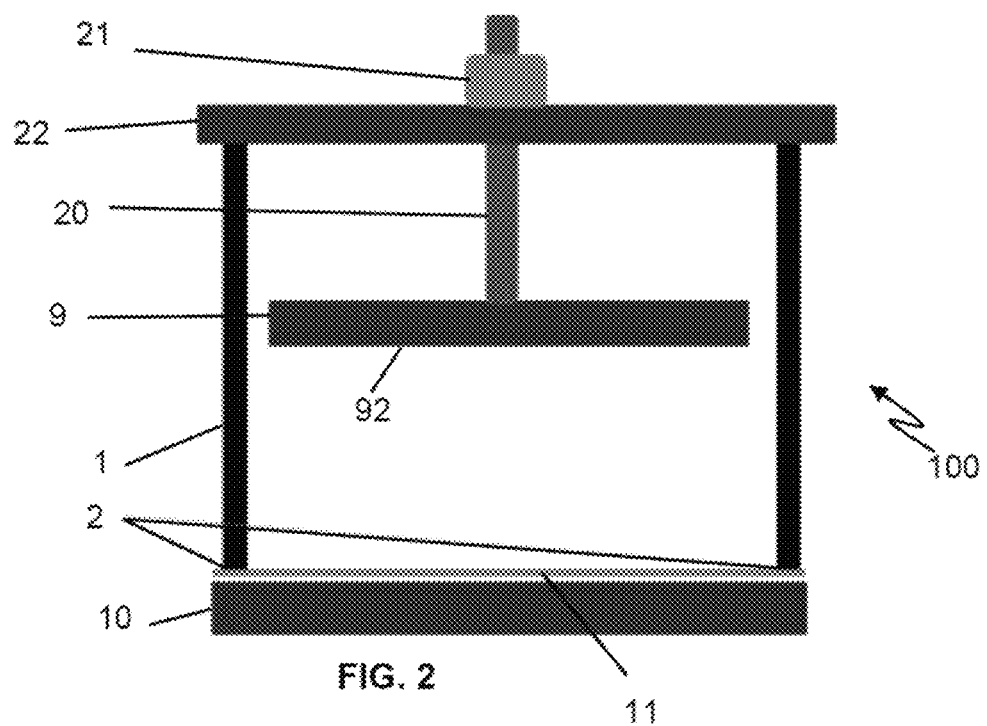
FIG. 2 shows a cross-sectional view of the device of FIG. 1A, and further showing a build platform of the device.

Referring now to FIG. 2, the mechanical assembly which renders the additive manufacturing device 100 capable of producing multi-layered objects is shown in more detail. As shown in FIG. 2, the device 100 comprises a build platform 9 having a build surface 92. The build surface 92 faces towards the lower wall 11 of vessel 1. The build platform 9 is suspended inside the vessel 1 above the lower wall 11 and the radiation module 10.

Build platform 9 is capable of moving or being made to move vertically upward and downward relative to vessel 1 above the lower wall 11, by means of a mechanical assembly 20 which may comprise ball screws, lead screws, belt drive mechanisms, a chain and sprocket mechanism, or a combination thereof, and a precision stepper motor 21. In a preferred embodiment, the movement mechanism comprises threaded rods and stepper motor 21, which is driven by a microcontroller 270 of a control system 200 of the device 100 (FIG. 7) and which can provide 5 µm precision in the vertical position of the build platform 9. The combined mechanical assembly 20 and stepper motor 21 are fixed upon or connected to a frame 22 which is supported on sidewalls 102. The frame 22 provides rigid support and a reference point for the vertical position of the build platform 9. Greater precision (up to about 1 µm) may also be achieved through a suitable choice of lead screw or belt pitch and the resolution (steps per full revolution) of the stepper motor.

Figure 3:
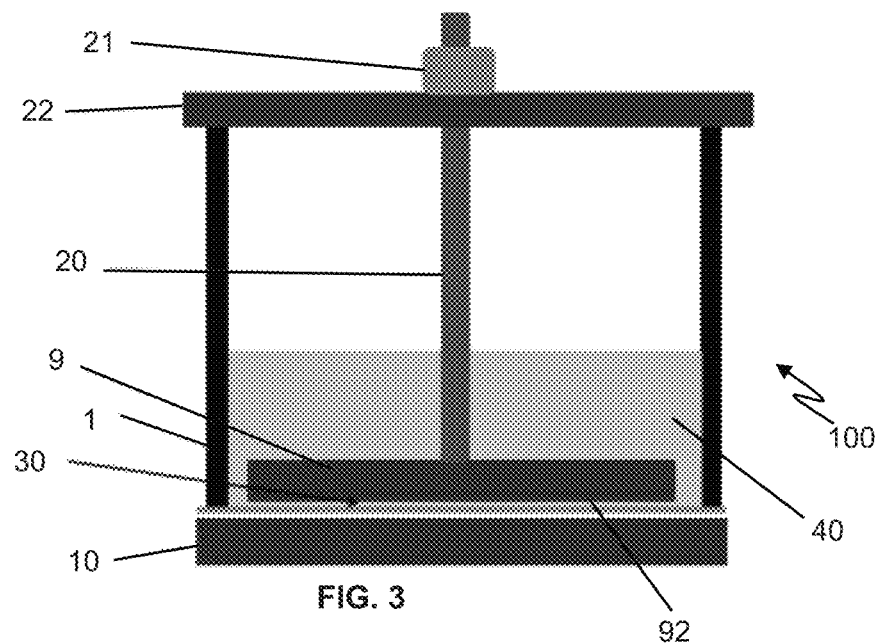
FIG. 3 shows the device of FIG. 1A and FIG. 2 during use, with a first layer of a three-dimensional object being polymerized.
Figure 4:
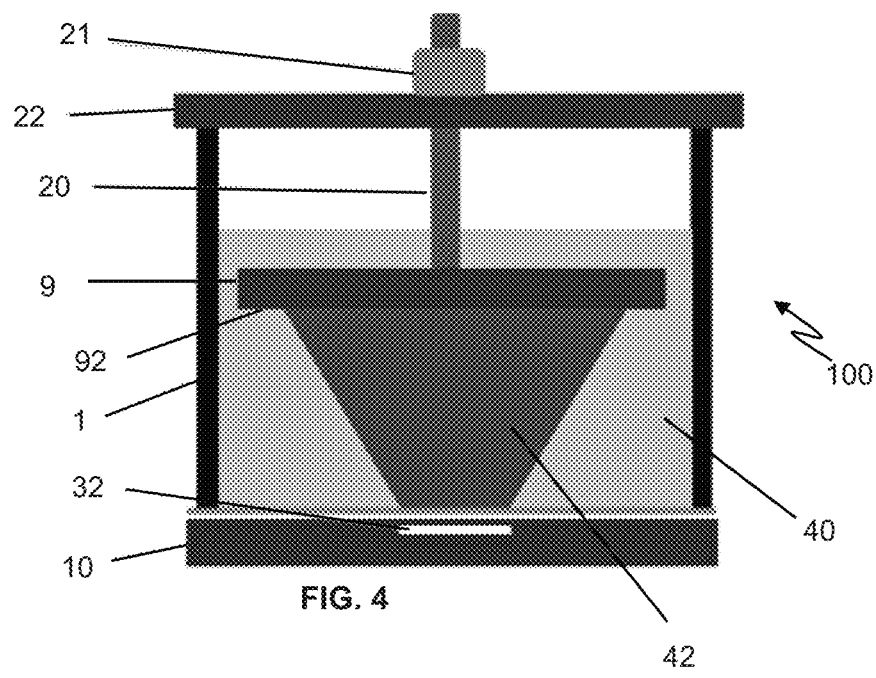
FIG. 4 shows the device of FIG. 1A and FIG. 2 during use, with a subsequent layer of the object being polymerized.

FIG. 3 and FIG. 4 illustrate an exemplary build process for a three-dimensional object 42. In FIG. 3, the vessel 1 is partially filled with a polymerizable material 40, such as a polymerizable resin. Next, the build platform is moved upwardly within the vessel 1 using the stepper motor 21 to actuate mechanical assembly 20, to define a thin layer 30 of the polymerizable material between the lower surface 92 of the build platform and the transparent lower wall 11 of the vessel 1. The layer 30 has a thickness chosen according to the desired resolution along the z-axis. Once the layer of uncured material 30 has been defined, radiation module 10 irradiates the layer 30 through the transparent lower wall 11 of vessel 1 with a predetermined pattern (as described above) so as to selectively polymerize desired areas of the thin layer of polymerizable material 30 with the predetermined pattern.

The transparent lower wall 11 may have a cure-inhibiting or non-stick coating so that the polymerized material does not adhere to it. In particular, the coating can be chosen so that the friction and/or adhesion between the transparent lower wall 11 and the polymerized material is less than the friction and/or adhesion between the build surface 92 and the polymerized material. Accordingly, when the stepper motor 21 actuates the assembly 20 to move the build platform 9 upwards for curing of the next layer of object 42, the polymerized material will tend to move with the build platform 9 instead of being pulled free due to adhesion to lower wall 11.

In some embodiments, a silicone sheet may be provided on the transparent lower wall 11. The cured portions of the printed object 42 will tend to adhere to the build platform (as the build platform is preferably fabricated of aluminium, acrylic, polycarbonate or other plastic to which the cured material adheres well) while the material does not adhere to the silicone sheet. A silicone sheet is preferred, as it is transparent and non-consumable. The non-stick coating is preferably made as thin as possible, since a thinner layer between the LCD (mask) and the material to be cured (resin/polymer/adhesive) means that there is less divergence of the light transmitted from the LCD before it reaches the resin/polymer/adhesive, thus resulting in a physical printing resolution closer to the LCD (mask) resolution.

In other embodiments, liquid coatings including mould release agents such as CHEMLEASE (registered trade mark) of Chem-Trend LP of Michigan, or solid sheets or coatings such as polyurethane, polytetrafluoroethylene (PTFE), fluorinated ethylene propylene (FEP) or latex can be used, so long as the material is transparent to the wavelength of light being used as a curing initiator and can be made sufficiently thin so as to prevent substantial resolution loss between the liquid crystal display resolution and the physical printing resolution. FEP is particularly preferred as it tends to be more transparent than PTFE at most curing wavelengths.

If a coating is used, it should be chosen to minimize divergence of the beam produced by a pixel of the radiation module 10 as the beam undergoes refraction through the coating. In particular, at the point where it reaches the layer of polymerizable material which is to be cured, the beam should cover an area which is less than four times the pixel surface area (e.g., for an LCD with pixels measuring 50×50 microns, the light passing through that pixel should not be larger than 100×100 microns when it reaches the layer). If it is any larger, it will overlap the beams produced by its neighbouring pixels by more than 25 microns, i.e. more than halfway into the neighbouring pixels, such that the neighbouring pixels are no longer resolvable. Preferably, the coating(s) result in pixel beams at the curing layer which have a surface area which is no more than 1.2× the LCD pixel surface area. This can be achieved by making the coatings very thin, and collimating the light prior to it passing through the LCD, so that the beam travelling through the LCD pixel is less divergent. For example, if a PTFE or FEP sheet is used as the coating, it may be have a thickness of approximately 70 μm. A thickness of under 50 μm may also be used. Typically, a coating thickness which is less than or equal to the pixel-to-pixel distance (resolution of the LCD) is desirable.

After polymerization of a layer is completed as discussed above in relation to FIG. 3, the mechanical assembly 20 is actuated by precision stepper motor 21 so that build platform 9 is raised upward by a small amount (equal to the desired layer thickness) relative to a reference point on frame 22 such that a void is created between the last polymerized layer and the top surface of the transparent lower wall 11 of the vessel. This void is rapidly filled by surrounding polymerizable material, which flows into the void under gravity, so that a new thin layer of such material exists between the bottom surface of the last polymerized layer and the top surface of the transparent lower wall 11 of vessel 1. This new layer of polymerizable material is irradiated from below by radiation module 10 so as to selectively polymerize a desired area using a pattern of radiation defined by active area 32 of the LCD 5 (i.e., an area which is unmasked due to pixels in that area being active), as shown in FIG. 4. As resin 40 is consumed, fresh resin may be added to replenish the vessel 1. Repeating this process for each subsequent layer and allowing desired area 32 to have any shape or number of shapes allows this additive manufacturing apparatus to produce a three-dimensional object having any shape, dimension or complexity within the boundaries of vessel 1 and the range of motion of build platform 9 as permitted by mechanical assembly 20.

In some embodiments, the device 100 may be configured such that the build surface is on the upper surface, rather than the lower surface, of the build platform 9. In these embodiments, the programmable radiation module 10 is positioned at the top of the vessel 1. During a build process, the build platform 9 starts with the build surface at the top of the fluid level in the vessel 1, and descends within the vessel 1 to define a thin layer of uncured material which is then cured by radiation module 10 in a desired pattern as previously described. The build platform 9 progressively descends within the vessel 1 in steps of the desired layer thickness, with each layer being cured with the respective desired layer pattern. The device of these alternative embodiments is very similar in construction to the device 100 shown in FIG. 1A to FIG. 4, except that in use, the vessel 1 needs to be filled with polymerizable material up to at least the height of the final object 42. Since the build surface in these arrangements may be spaced from the top surface of the vessel 1 and the radiation module 10, a non-stick coating may not be required on the top surface.

In the device 100 of FIGS. 1-4, as described above, the transparent lower wall 11 may have a cure-inhibiting or non-stick coating so that when a layer is cured, the build platform 9 can simply be moved up in order to separate the cured layer from the transparent lower wall 11 to enable curing of the next layer. If a non-stick layer is not provided, alternative mechanisms for separating the most recently cured layer from the vessel or the radiation module may be employed, as illustrated in FIG. 5A to FIG. 5E and FIG. 6A to FIG. 6E.

Figure 5A:
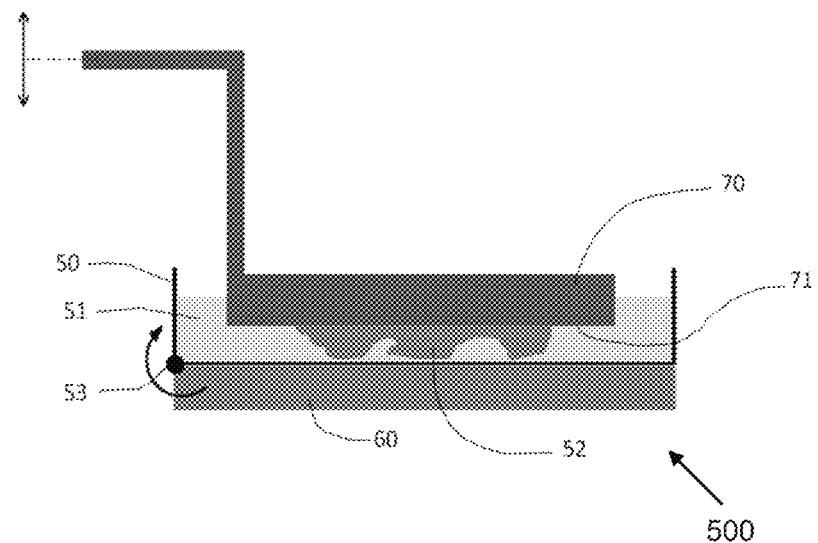
FIGS. 5A, 5B and 5C illustrate an additive manufacturing device according to some embodiments, in which a completed model is separated from a build platform by peeling.

In FIG. 5A, an additive manufacturing device 500 comprises a vessel in the form of a basin 50 which contains a polymerizable fluid 51. A build platform 70 having a lower build surface 71 is submerged inside the basin 50. The build platform 70 is vertically movable relative to the basin 50 by a mechanism similar to that described above, except that the mechanical assembly 20 and stepper motor 21 may be mounted to a support frame which is separate from the basin 50. A thin layer of polymerizable fluid 51 is defined between build surface 71 and the contact surface of a programmable radiation module 60, which is capable of emitting patterned light of suitable wavelength to initiate the polymerization (curing) of fluid 51. The radiation module 60 may be substantially the same as the radiation module 10 described above, for example.

Figure 5B:
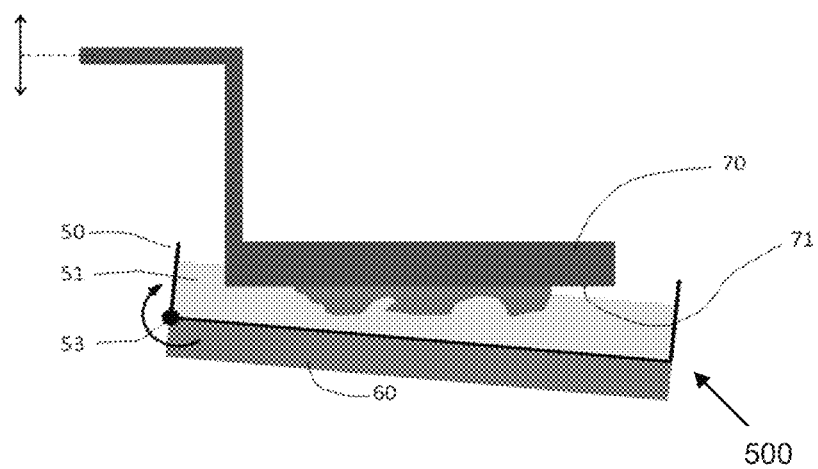

The basin 50 is pivotable about point 53. After a layer of fluid 51 has been cured to form part of a printed object 52, the basin 50 pivots about point 53, as shown in FIG. 5B, so as to "peel" the recently cured layer off the face of the radiation module 60. If the radiation module 60 is separate from the basin 50, with the basin 50 having a transparent lower wall (as described above), the pivoting movement of the basin 50 acts to peel the recently cured layer from the transparent internal bottom face of the basin. In some embodiments, rather than the basin 50 being pivotable, the build platform 70 may be pivotable about its support.

Figure 5C:
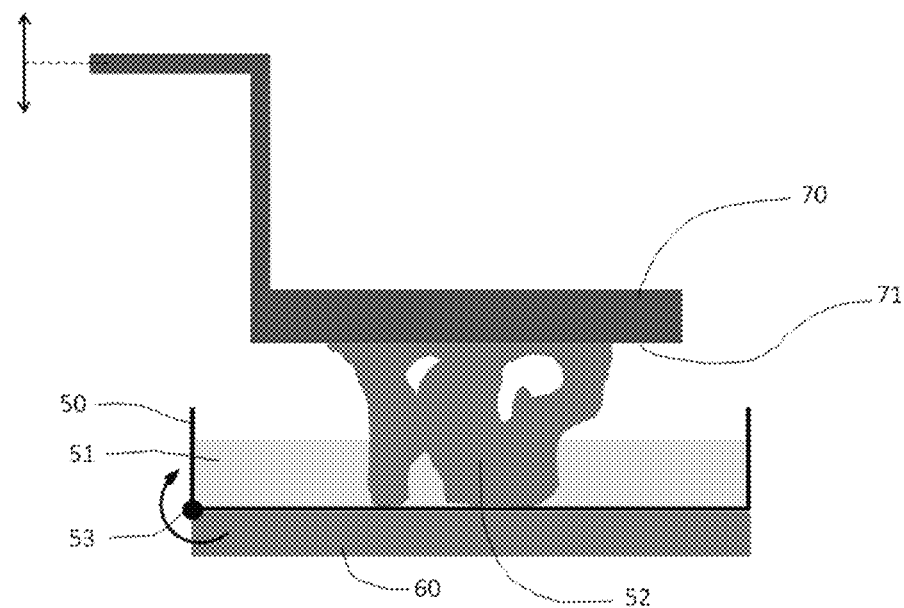

As shown in FIG. 5C, the amount of polymerizable fluid 51 required to print a given object 52 using the device 500 is relatively small, because the curing process always takes place at the bottom of basin 50 when the radiation module 60 is mounted below the basin, irradiating upward. As polymerisable fluid 51 is consumed during a printing operation, additional fluid may be added to vessel 50, for example by pumping it into the vessel 50. A level sensor (not shown) may be used to provide a feedback signal to the control system 200 (FIG. 7) of the device 500 that additional fluid is required, and the control system 200, via microcontroller 270, may then actuate a pump (not shown) to pump a desired volume of fluid into vessel 50.

Figure 5D:
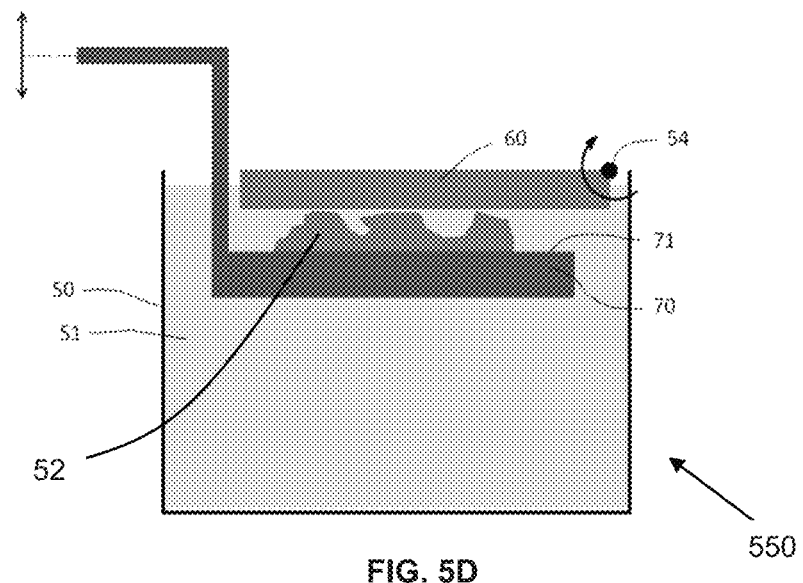
FIGS. 5D and 5E illustrate an additive manufacturing device according to other embodiments, in which a completed model is separated from a build platform by peeling.

In the arrangement of FIG. 5D, an alternative additive manufacturing device comprises a basin 50 containing polymerizable fluid 51, a thin layer of which is defined between the last polymerized layer and the contact surface of radiation module 60, which is partially immersed in the polymerizable fluid 51, and which irradiates the thin polymerizable fluid layer from above. After a given layer of fluid is polymerized, the radiation module 60 may pivot about point 54 so as to "peel" the last polymerized layer off the radiation module's contact surface. As for the arrangement of FIG. 5A-5C, rather than the basin 50 being pivotable, the build platform 70 may be pivotable about its support.

Figure 5E:
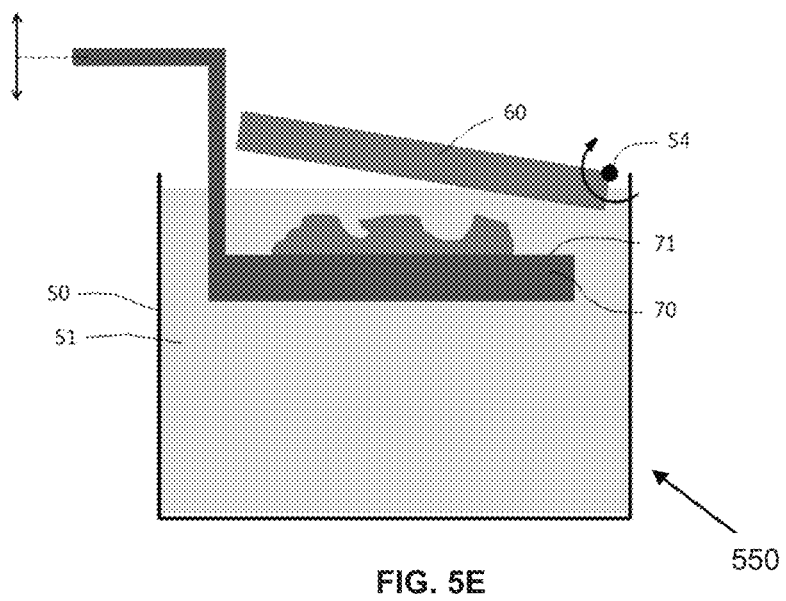

In the arrangement of FIG. 5D and FIG. 5E, the printed object is positioned on top of build surface 71 of build platform 70, so that the weight of the printed object 52 assists (rather than counteracting) the separation (peeling) of the last cured layer from the radiation module 60 contact surface.

Figure 6A:
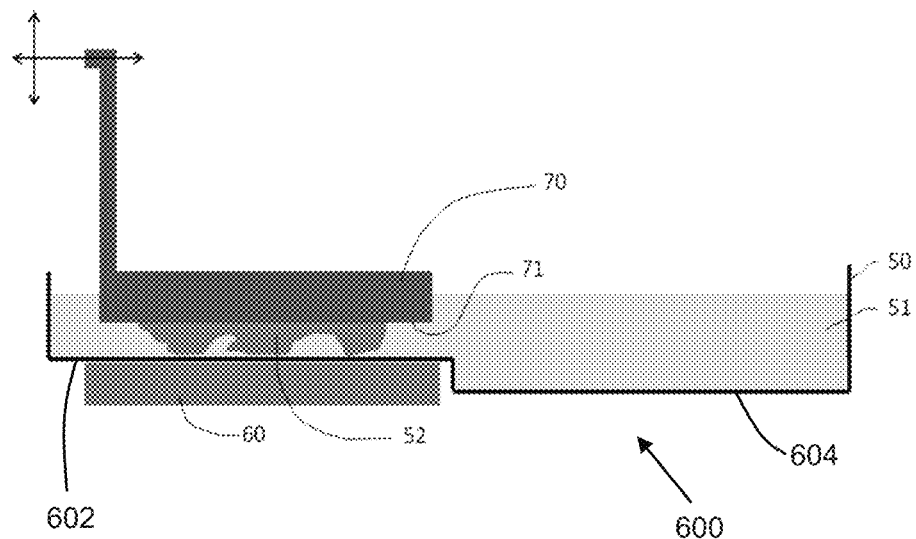
FIGS. 6A and 6B illustrate an additive manufacturing device according to further embodiments, in which a completed model is separated from a build platform by shearing.
Figure 6B:
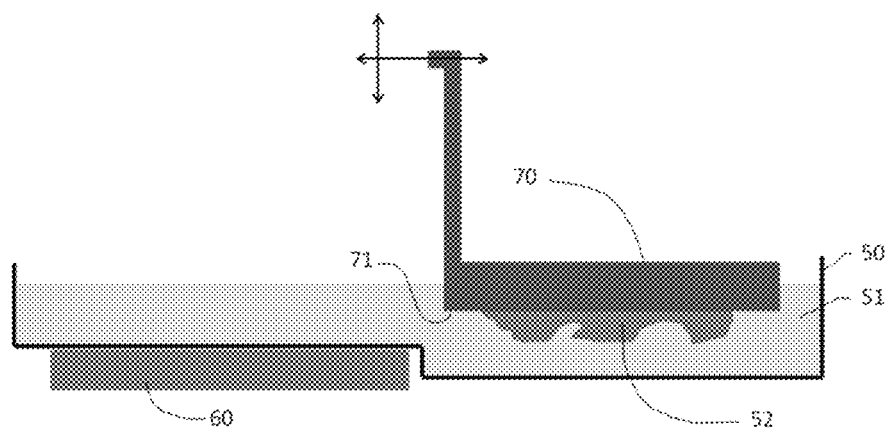
Figure 6C:
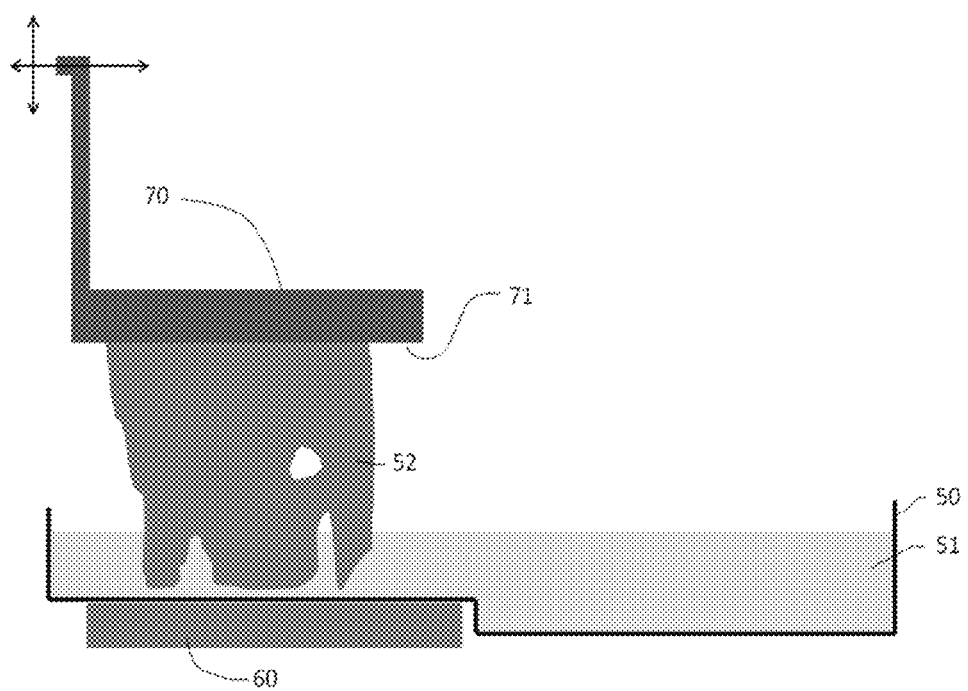
FIGS. 6C and 6D illustrate an additive manufacturing device according to yet further embodiments, in which a completed model is separated from a build platform by shearing.

Turning now to FIG. 6A to FIG. 6C, there is shown a further example of an additive manufacturing device 600, having a basin 50 of increased width compared to the basin 50 of FIG. 5A to FIG. 5C. The basin 50 has a first region 602 below which the radiation assembly 60 is positioned in order to successively polymerize thin layers of fluid 51 in order to build up an object 52. The basin 50 also has a second region 602, having greater depth than the first region 602.

The device 600 comprises a build platform 70 which is capable of moving both vertically and horizontally. After one layer of fluid 51 has been polymerized by irradiation from below in the first region 602, the build platform 70 moves laterally to the region 604 of basin 50 having greater depth than first region 602. Alternatively, the build platform 70 may remain stationary while the basin 50 and radiation module 60 move laterally (for example, on a translation stage to which the basin 50 and radiation module are coupled) until the region 604 is positioned directly underneath the build platform 70. This mechanism makes use of the fact that the adhesion forces between a recently polymerized layer and the contact surface of radiation module 60 are predominantly vertical forces, i.e. far less friction is encountered by laterally sliding the printed object 52 off the contact surface into the deeper region 604 of basin 50.

Once the platform 70 and printed object 52 have arrived at the deeper end 604, the vertical adhesion forces are no longer present and build platform 70 is capable of moving upward by a desired distance. After this, the platform may move back (laterally) to the shallower region 602 of the basin, again defining a thin layer of polymerizable fluid between the last polymerized layer and the contact surface of the radiation module 60, so that this new layer may be polymerized.

As shown in FIG. 6C, the amount of polymerizable fluid 51 required to print a given object 52 is relatively small, because the curing process always takes place at the bottom of basin 50 when the radiation module 60 is mounted below the basin, irradiating upward. Accordingly, objects 52 of substantially greater height than that of the basin 50 may be printed. Additional fluid 51 may be pumped into the vessel 50 by a pump, under feedback control using a level sensor of control system 200 of device 600, as previously described.

Figure 6D:
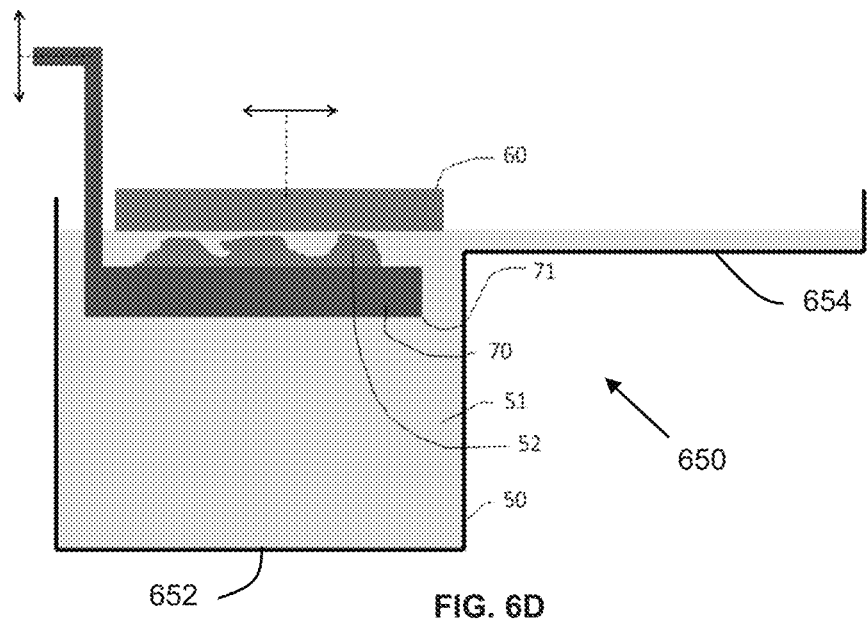
Figure 6E:
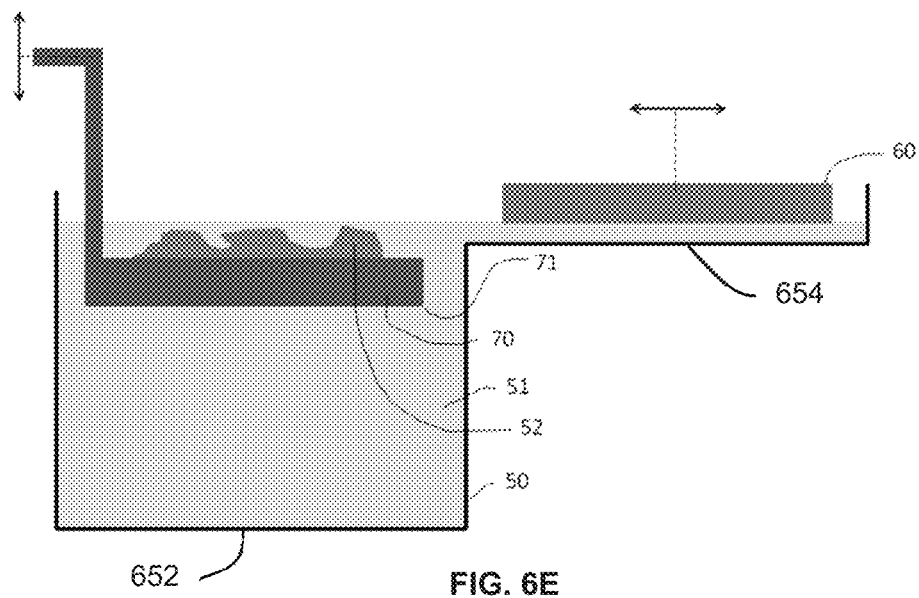
FIG. 6E illustrates an additive manufacturing device according to yet further embodiments, in which a completed model is separate from a build platform by shearing.

Referring now to FIG. 6D and FIG. 6E, in a yet further embodiment of an additive manufacturing device 650, a basin 50 containing polymerizable fluid 51 has a first region 652, and a second region 654 disposed next to the first region 652, which is shallower than the first region 652. The device 650 comprises a build platform 70 which is capable of vertical motion, and an radiation module 60 which is capable of lateral (sliding) motion. The radiation module 60 irradiates the polymerizable fluid 51 from above in first region 652 to create an object 52 layer-by-layer on upper build surface 71 of build platform 70. A thin layer of polymerizable fluid 51 is defined between the previous polymerized layer and the contact surface of the radiation module 60. After this layer is cured by irradiating it from above, the radiation module 60 may move laterally to the shallower region 654 (FIG. 6E), after which build platform 70 may move downward into basin 50 by a desired distance corresponding to the desired layer thickness. When radiation module 60 slides back to its original position 652 a new layer of unpolymerized fluid is defined between its bottom contact surface and the top of the last polymerized layer.

The radiation source of radiation module 10 or radiation module 60 may be any radiation source suitable for curing the polymerizable material 40 or 51, such as visible, UV or infrared light, or other actinic radiation, such as X-rays. The radiation source may be of any suitable dimension and have any number of optical components to collimate or direct it at at least an area of the LCD panel 5, for example. The radiation source may be movable or stationary.

In certain embodiments, the radiation source is a visible light (400-700 nm) source. Some embodiments comprise a white LED stroboscopic lamp as a radiation source, as these lamps have peak intensities at 460 and 550 nm. This is because white light as such cannot be created; instead the LED generates blue light (460 nm) and a phosphorus internal coating absorbs this partially and emits green (550 nm) such that the combined emission appears to the human eye as white light. This light source is suited for visible-light polymerizable materials. In other embodiments, the radiation source may emit in the range 300-450 nm.

In some embodiments, UV light may be used as a radiation source. Advantageously, UV photons carry higher energy than visible light photons and many polymers are available that cure in UV light. If UV light is used as the radiation source then it may be necessary to use a dynamic mask generator other than an LCD since liquid crystals may deteriorate when exposed to ultraviolet light. Alternative dynamic mask generators may comprise electrowetting displays, transmissive electrophoretic displays, and printers for continuously generating physical masks (e.g., continuous (ribbon) laser or inkjet printing of transparencies).

An example of a control system 200 of the additive manufacturing devices described above is shown in FIG. 7. The control system 200 may include a computer system 201 comprising standard computer components, including non-volatile storage (such as a hard disk or solid-state disk) 204, random access memory (RAM) 206, at least one processor 208, and external interfaces 210, 212, 214, 218, all interconnected by a bus 216. The external interfaces include universal serial bus (USB) interfaces 210, and a network interface connector (NIC) 212 which connects the system 201 to a communications network 220 such as the Internet, via which a user computer system 240 may communicate with the control system 200 to allow the user to interact with the device 100. The user computer system 240 may be a standard desktop or laptop computer system, such as an Intel IA-32 based computer system, or a mobile computing device such as a smartphone or tablet computer. The control system 100 can receive input data via NIC 212 or from a storage device connected to one of the USB interfaces 210, or to an alternative interface such as a secure digital (SD) interface (not shown).

In some embodiments, the user may interact directly with the computer system 201, by means of a display, keyboard and mouse or other input/output devices connected via one of the interfaces 210, and an additional display adapter (not shown). In alternative embodiments the computer system may comprise a touchscreen input/output device connected to bus 216, for example by a display adapter (not shown). In these embodiments, the user computer system 240 may be unnecessary. A 3D model file may be loaded onto the computer system 201 by the network connection 220 or SD card or USB storage connected via external interface(s) 210 and the user can then control the slicing process directly on the additive manufacturing device via e.g. the touch screen interface of computer system 201.

The system 201 also includes a display adapter 214, which is used to communicate with the LCD 5. The display adapter 214 may be a high-definition multimedia interface (HDMI), video graphics array (VGA) or digital visual interface (DVI), for example.

The storage medium 204 may have stored thereon a number of standard software modules, including an operating system 224 such as Linux or Microsoft Windows, and one or more modules 202 comprising instructions for causing the at least one processor 208 to carry out various operations, including receiving input data relating to a 3D model (representing the object to be built) via USB interface(s) 210 and/or network interface 212; processing the input data to generate a sequence of layer patterns; and successively transmitting the layer patterns to LCD 5 (or alternatively, another type of dynamic mask generator or an LED or OLED display) via display adapter 214, and signaling a microcontroller 270 to actuate mechanical, electrical and/or optical components of the additive manufacturing device. In some embodiments, the 3D model data may be provided in STL, STEP or another 3D vector file format, and stored on storage medium 204 for processing by module(s) 202. In other embodiments the input 3D model data may be received layer-by-layer from user computing system 240 or elsewhere via communications network 220 and stored either in RAM 206 or on storage medium 204 for processing by module(s) 202.

Processes executed by the system 201 are implemented in the form of programming instructions of one or more software modules or components 202 stored on the storage medium 204 associated with the computer system 201, as shown in FIG. 7. However, it will be apparent that the processes could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

Figure 8:
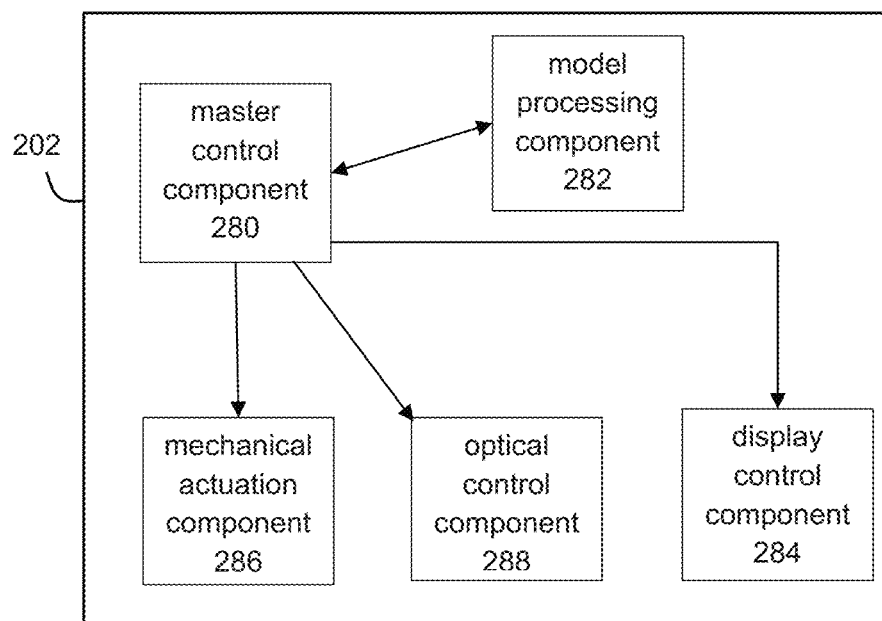
FIG. 8 is a block diagram of software components of the control system of FIG. 7.

In one example, as shown in FIG. 8, the software components 202 comprise a master control component 280, which coordinates the overall flow of an additive manufacturing process which is under the control of control system 200. The master control component 280 is in communication with a mechanical actuation component 286 which generates control signals to drive, via microcontroller 270, mechanical components of the additive manufacturing device, such as pumps and motors. Master control component 280 is also in communication with optical control component 288 which generates control signals to (via microcontroller 270) turn the radiation source of radiation assembly 10 or 60 on or off, and to control the duration and intensity of irradiation.

Master control component 280 may accept user input data, such as the 3D model data, and build parameters such as the positioning and orientation of the object with respect to the build surface, arrangement of multiple objects in the same batch print, and the desired print layer thickness (which determines how many slices need to be generated, etc.). The input data can then be passed to model processing component 282, which "slices" the 3D model data in accordance with the build parameters to generate a sequence of two-dimensional image files, which can be stored on storage medium 204 for example. The model processing component may comprise any known slicing software module, such as GnexLab, EnvisionLabs Creation Workshop, Slic3r or FreeSteel. Once the slicing operation has been performed by model processing component 282, the output slices are passed by master control component 280 to display control component 284, which is configured to send control signals to LCD 5 to turn individual pixels of pixel array 256 on or off in accordance with the pattern corresponding to an image slice transmitted by the display control component 284.

During a printing operation, the slices (image files) are transmitted by display control component 284 (through the display adapter 214) to a scalar board 252 of the LCD 5. A scalar board is a standard and widely used method of interfacing with displays. Typically, scalar boards are embedded as part of the electronics assembly inside commercially available LCD monitors or televisions. The scalar board 252 translates an image or video file from digital signal (HDMI or DVI) or analogue signal (VGA) into low voltage differential signals (LVDS) which are interpretable by an internal control board 254 of the LCD 5. Internal control board 254 switches pixels of the pixel array 256 on or off in accordance with the input image received from the display control component 284.

During printing, the computer system 201 also interfaces, via a USB or serial interface (such as an RS-232 interface) with a microcontroller 270 which is capable of driving all other actuators of the additive manufacturing device. For example, the microcontroller 270 may drive stepper motors 21, the light source of radiation module 10 or 60, one or more pumps (not shown) for pumping additional polymerizable medium 40 or 51 into the vessel 1 or 50, linear or rotational motion actuators for driving motion of vessel 50 and/or build platform 70 and/or radiation module 60, and so on. Microcontroller 270 may also read input from various sensors, such as a level sensor for polymerizable material in the vessel, a build platform height sensor, lateral sliding travel end-stop sensor(s) for vessel 50 and/or build platform 70 and/or radiation module 60, vertical end-stop sensors, temperature sensors, a hatch-closed sensor for support 22, and so on.

After each layer (slice image file) is sent from the display control component 284 to the scalar board 252 and thus projected on the display 5 for the required curing time (which may be provided as one of the build parameters and/or determined according to the intensity and emission spectrum of the light source, and the nature of the polymerizable medium) the master control component 280 may instruct, with appropriate timing and sequencing, mechanical actuation component 286 and optical control component 288 to send signals to the microcontroller 270 which can interpret them and drive the various motors, pumps and light source in the desired sequence.

Figure 9:
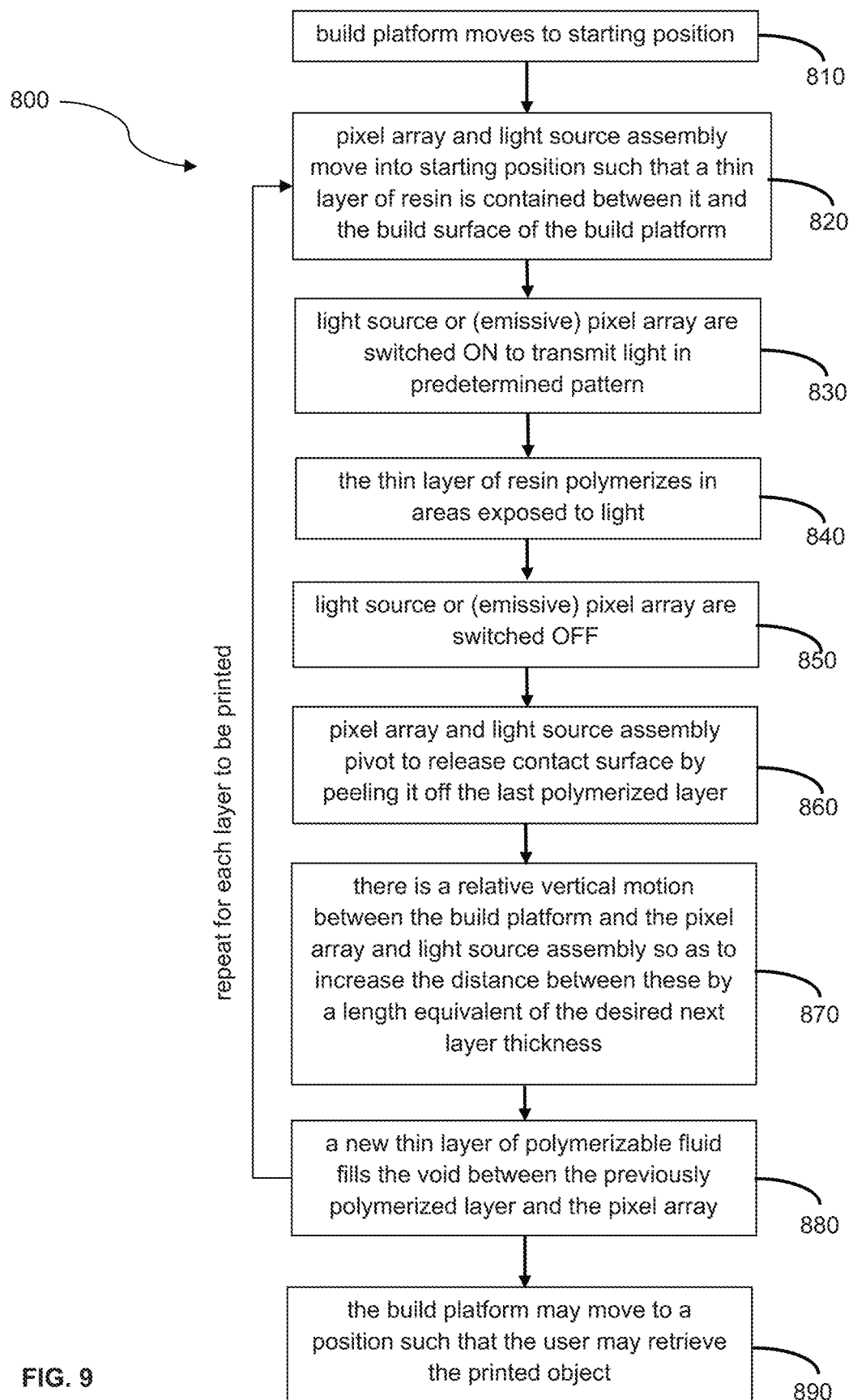
FIG. 9 is a flow diagram of an additive manufacturing process according to some embodiments.

An exemplary additive manufacturing method implementable using the additive manufacturing device 500 of FIG. 5A to 5C or the additive manufacturing device 550 of FIGS. 5D and 5E is depicted in FIG. 9. At step 810, mechanical actuation component 286 sends a signal to microcontroller 270 to move the build platform 70 to its starting position. If necessary, at step 820 the radiation assembly 60 is moved to a starting position (again, via mechanical actuation component 286) such that a thin layer of polymerisable material is defined between the build surface of the build platform 70 and the radiation assembly 60.

At step 830, the radiation source of radiation assembly 60 is switched on by optical component 288, and the pixel array 256 of LCD 5 is controlled in accordance with a desired pattern corresponding to a first image slice of the object to be built, by display control component 284 as discussed above. In embodiments where the radiation assembly 60 comprises an LED pixel array, then the radiation source need not be switched on separately since the display control component 284 can simply project the desired pattern directly from the LED pixels. As a result of the patterned radiation, the thin layer of polymerisable material polymerizes in the regions which are exposed to radiation (step 840).

Once the thin layer is cured in the desired manner, the pixel array 256 and/or radiation source are switched off (step 850) by display control component 284 and/or optical component 288. Next, at step 860, the radiation assembly 60 and/or the vessel 50 may pivot relative to the build platform 70 (or vice versa) about hinge 53 in order to release the cured layer from a contact surface at the vessel 50 surface or the radiation assembly 60 surface.

To position the device 500 or 550 to polymerise the next layer of the object, at step 870 the mechanical actuation component 286 sends a control signal to an actuator of build platform 70 or an actuator of radiation assembly 60, via microcontroller 270, in order to move the build platform 70 vertically relative to the radiation assembly 60 by an amount equal to the desired layer thickness. This causes a new thin layer of polymerisable material to fill a void left between the previously cured layer and the radiation assembly 60. Steps 820 to 880 are repeated for each layer of the object to be built. Finally, at step 890, mechanical actuation component 286 may send a signal to the actuator of build platform 70 in order to move the build platform 70 to a position where a user may easily remove the finished object from the build surface.

Figure 10:
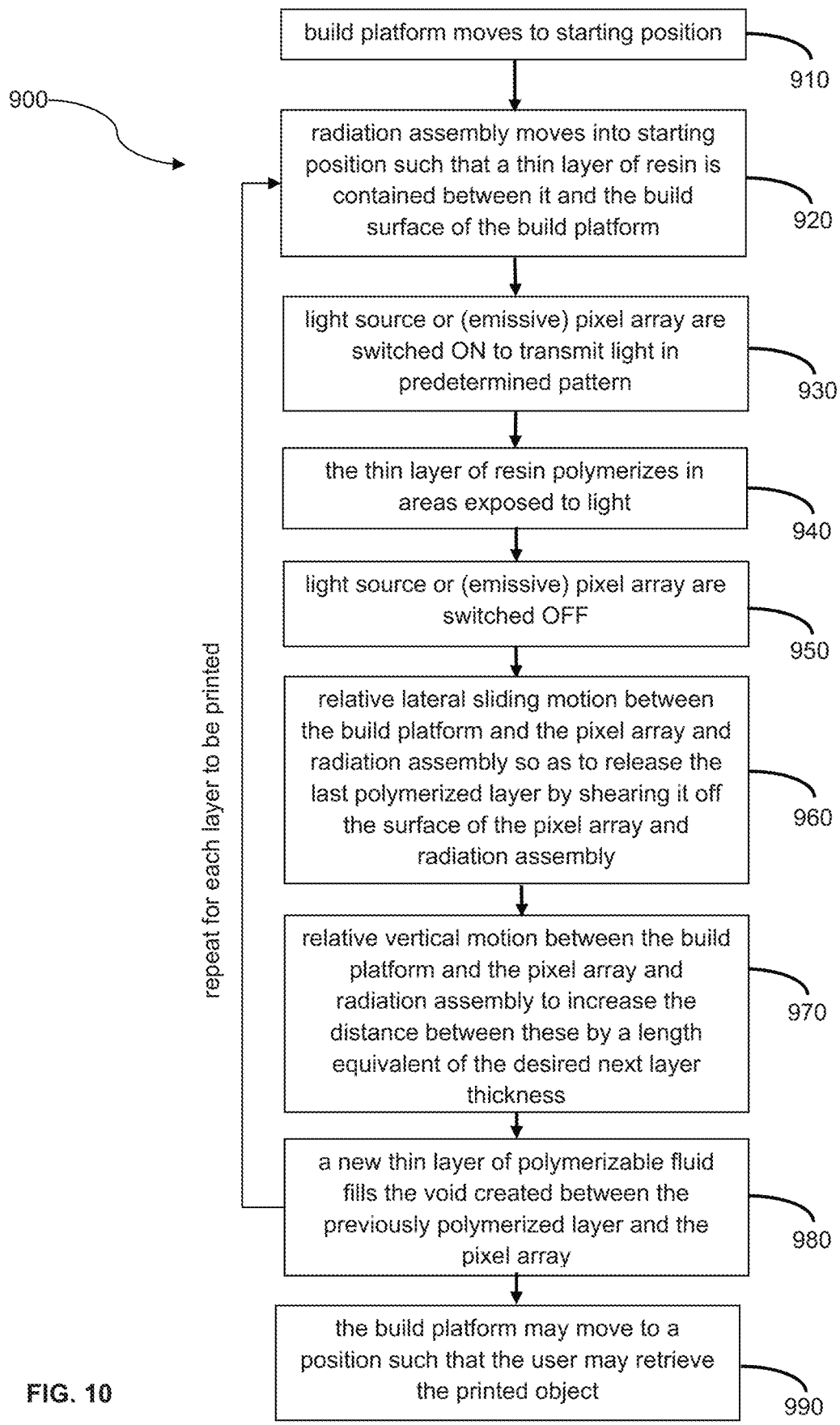
FIG. 10 is a flow diagram of an additive manufacturing process according to other embodiments.

An alternative embodiment of an additive manufacturing method, for example, implementable by the additive manufacturing device 600 of FIG. 6A to 6C or the additive manufacturing device 650 of FIGS. 6D and 6E, is shown in FIG. 10.

The method 900 is in many respects similar to method 800. At step 910, mechanical actuation component 286 sends a signal to microcontroller 270 to move the build platform 70 to its starting position. If necessary, at step 920 the radiation assembly 60 is moved to a starting position (again, via mechanical actuation component 286) such that a thin layer of polymerisable material is defined between the build surface of the build platform 70 and the radiation assembly 60.

At step 930, the radiation source of radiation assembly 60 is switched on by optical component 288, and the pixel array 256 of LCD 5 is controlled in accordance with a desired pattern corresponding to a first image slice of the object to be built, by display control component 284 as discussed above. In embodiments where the radiation assembly 60 comprises an LED pixel array, then the radiation source need not be switched on separately since the display control component 284 can simply project the desired pattern directly from the LED pixels. As a result of the patterned radiation, the thin layer of polymerisable material polymerizes in the regions which are exposed to radiation (step 940).

Once the thin layer is cured in the desired manner, the pixel array 256 and/or radiation source are switched off (step 950) by display control component 284 and/or optical component 288. Next, at step 960, mechanical actuation component 286 sends an actuation signal to move the radiation assembly 60 and/or the vessel 50 laterally relative to the build platform 70 (or vice versa) in order to release the cured layer from a contact surface at the vessel 50 surface or the radiation assembly 60 surface by a shearing motion as previously described.

To position the device 500 or 550 to polymerise the next layer of the object, at step 970 the mechanical actuation component 286 sends a control signal to an actuator of build platform 70 or an actuator of radiation assembly 60, via microcontroller 270, in order to move the build platform 70 vertically relative to the radiation assembly 60 by an amount equal to the desired layer thickness. This causes a new thin layer of polymerisable material to fill a void left between the previously cured layer and the radiation assembly 60. Steps 920 to 980 are repeated for each layer of the object to be built. Finally, at step 990, mechanical actuation component 286 may send a signal to the actuator of build platform 70 in order to move the build platform 70 to a position where a user may easily remove the finished object from the build surface.

Although particular embodiments have been described and illustrated, it will be appreciated by those of ordinary skill in the art that various modifications and combinations of features of the above embodiments are possible without departing from the scope of the invention as defined in the appended claims.

The invention claimed is:

1. An additive manufacturing method, comprising:
providing a vessel for containing a material which is polymerisable on exposure to radiation, wherein providing the vessel comprises providing a vessel that has sidewalls and a transparent lower wall at a bottom of the vessel;
providing a rigid transparent member;
providing a programmable radiation module comprising an array of individually addressable radiation emitting or transmitting elements,
wherein providing the programmable radiation module comprises attaching the programmable radiation module to the transparent lower wall and the sidewalls of the vessel such that the rigid transparent member is disposed between the bottom of the vessel and the programmable radiation module;
providing a build platform having a build surface;
positioning the build platform relative to the vessel such that an uncured layer of polymerisable material is defined between the build surface and the programmable radiation module;
and irradiating the uncured layer of polymerisable material with radiation having a particular pattern, without magnification, by selectively activating elements of the array of the programmable radiation module in order to polymerise the uncured layer with the particular pattern.

2. The additive manufacturing method of claim 1, wherein the build surface faces the transparent lower wall, and wherein irradiating the uncured layer comprises irradiating the uncured layer upwardly through the transparent lower wall.

3. The additive manufacturing method of claim 1, wherein providing the programmable radiation module comprises providing a dynamic mask component comprising the array of individually addressable radiation emitting or transmitting elements, and a radiation source for irradiating through the dynamic mask component.

4. The additive manufacturing method of claim 1, wherein the programmable radiation module comprises a liquid crystal display (LCD).

5. The additive manufacturing method of claim 4, wherein the LCD is a monochrome LCD.

6. The additive manufacturing method of claim 1, wherein the array of individually addressable radiation emitting or transmitting elements comprises an LED array or an OLED array.

7. The additive manufacturing method of claim 1, wherein providing the vessel comprises providing a non-stick layer or a polymerization-inhibiting layer between the programmable radiation module and the build platform.

8. The additive manufacturing method of claim 1, further comprising releasing the polymerized layer from a contact surface by pivoting the programmable radiation module relative to the build platform.

9. The additive manufacturing method of claim 1, further comprising pivoting the programmable radiation module and the vessel relative to the build platform to release the polymerized layer from a contact surface.

10. The additive manufacturing method of claim 1, further comprising releasing the polymerized layer from a contact surface by horizontally translating at least one of: the vessel and the programmable radiation module relative to the build platform, or vice versa.

* * * * *